No. 739,601. PATENTED SEPT. 22, 1903.
D. E. JOHNSON.
METAL WORKING BY ELECTRICITY.
APPLICATION FILED MAR. 14, 1903.
NO MODEL.
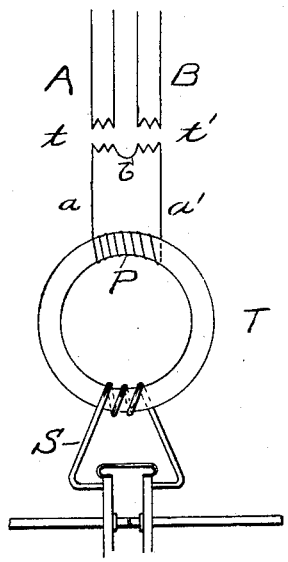

No. 739,601. Patented September 22, 1903.

UNITED STATES PATENT OFFICE.

DANIEL E. JOHNSON, OF HARTFORD, CONNECTICUT.

METAL-WORKING BY ELECTRICITY.

SPECIFICATION forming part of Letters Patent No. 739,601, dated September 22, 1903.

Application filed March 14, 1903. Serial No. 147,857. (No model.)

*To all whom it may concern:*

Be it known that I, DANIEL E. JOHNSON, a citizen of the United States of America, residing at Hartford, in the county of Hartford and State of Connecticut, have invented certain new and useful Improvements in Metal-Working by Electricity, of which the following is a specification.

My invention relates to improvements in those methods and apparatus for preparing metals for subsequent manipulation wherein the metals are first heated to the desired degree by subjecting them to the action of a suitable electric current.

The invention is especially applicable to processes of electric welding.

More particularly the invention relates to certain arrangements whereby the commercial polyphase systems (which are now in general use for supplying electric power from central stations) may be utilized for the purposes above set forth.

The invention will be described in its adaptation to an electric welding-machine.

The drawing shows diagrammatically an embodiment of my invention.

As is well known, the simple alternating current has been found to be best adapted for use in electric welding-machines. It has not been customary until a comparatively recent date to supply electric power for the operation of machines from central stations, and in installing a welding plant it has been the practice to supply as a part of the apparatus a generator to furnish the desired current. The wide use of electricity for power purposes at the present time is accounted for largely by the advantages of the polyphase systems, which permit of an economical transmission and distribution of current from a central station, and these polyphase systems have now come into general use. However, up to the present time these polyphase currents have not been considered as applicable for use in electric welding-machines, and the welding plants furnished to-day do not differ materially in their component parts from those which have been in use since the process was first introduced.

Electric welding plants have not come into general use because of the great initial cost of their installation; also, for the reason that if they were not used continuously a large amount of power is lost, owing to the fact that the generator must be run continuously in order to have the current ready for use when it is desired. By the invention herein described any commercial polyphase system of current can be utilized in a welding-machine, no loss of power occurring while the machine is not in operation, and the cost of the generator and the power required to run it are saved.

A B in the drawing denote the wires of a two-phase system, carrying the commercial current as supplied by a central power-station to a point where it is to be utilized. $t\ t'$ denote transformers, in which the current is "stepped down" to a voltage required for the operation of motors, lights, &c. At the transformers I bridge the secondaries $b\ b'$ and lead out from the transformer the current carried by the outer wires $a\ a'$ of each phase. These wires $a\ a'$ are led to and connected with the primary P of the transformer T of a welding-machine. In the secondary S there is induced a single-phase alternating current. The secondary S is arranged with the clamps, pressure devices, &c., according to the designs of standard welding-machines, for operation in the desired manner.

It is apparent that if the current of a single-phase of a polyphase system were used in the transformer of a machine of this sort the whole system would be thrown out of balance, but by combining the two phases in the manner above described I insure that the polyphase will always remain balanced.

By the above-described adaptation of polyphase systems for electric welding the cost of the plant is reduced to such an extent that they can be quite universally adopted, and the cost of making a weld has been found to be considerably less than by previous systems of electric or other welding.

I claim as my invention—

In combination, an electric welding device;

a circuit carrying a single-phase alternating current to said device from the secondary element of a transformer; said transformer; a plurality of circuits carrying alternating currents of different phases to the primary elements of a second transformer; and said second transformer, the secondary elements of which are bridged and connected with the primary element of said first-named transformer.

In testimony whereof I affix my signature in presence of two witnesses.

DANIEL F. JOHNSON.

Witnesses:
H. B. BELFIELD,
L. E. SMITH.